(12) United States Patent
Bourvellec et al.

(10) Patent No.: US 12,194,669 B2
(45) Date of Patent: Jan. 14, 2025

(54) METHOD FOR ANGULAR ORIENTATION OF HOLLOW BODIES IN A PLANT FOR MANUFACTURING CONTAINERS

(71) Applicant: SIDEL PARTICIPATIONS, Octeville-sur-Mer (FR)

(72) Inventors: Loïc Bourvellec, Octeville-sur-Mer (FR); Hervé Pasquier, Octeville-sur-Mer (FR); Pierrick Protais, Octeville-sur-Mer (FR)

(73) Assignee: SIDEL PARTICIPATIONS, Octeville-sur-Mer (FR)

( * ) Notice: Subject to any disclaimer, the term of this patent is extended or adjusted under 35 U.S.C. 154(b) by 186 days.

(21) Appl. No.: 17/788,859

(22) PCT Filed: Dec. 22, 2020

(86) PCT No.: PCT/EP2020/087663
§ 371 (c)(1),
(2) Date: Jun. 24, 2022

(87) PCT Pub. No.: WO2021/130243
PCT Pub. Date: Jul. 1, 2021

(65) Prior Publication Data
US 2023/0023175 A1    Jan. 26, 2023

(30) Foreign Application Priority Data

Dec. 26, 2019   (FR) ...................................... 1915597

(51) Int. Cl.
*B29C 49/42*   (2006.01)
*B29C 49/78*   (2006.01)
*B29L 31/00*   (2006.01)

(52) U.S. Cl.
CPC .. *B29C 49/42065* (2022.05); *B29C 49/42095* (2022.05); *B29C 49/42119* (2022.05); (Continued)

(58) Field of Classification Search
CPC ........ B29C 49/42065; B29C 49/42095; B29C 49/42119
See application file for complete search history.

(56) References Cited

U.S. PATENT DOCUMENTS 5,853,775 A   12/1998  Oas
6,464,486 B1  10/2002  Barray
(Continued)

FOREIGN PATENT DOCUMENTS

FR    2874193 A1    2/2006

OTHER PUBLICATIONS

International Search Report dated Mar. 17, 2021 for Application No. PCT/EP2020/087663.

*Primary Examiner* — James Sanders

(57) ABSTRACT

A method for regulation of the angular position of hollow bodies in an installation for production of containers. The hollow bodies are moved by individual support members each of which is equipped with means for causing the hollow body to turn about its axis. The method includes a first step of measuring an angular offset of at least one particular hollow body relative to a reference angular position in a measurement zone. The method also includes a second step of compensating of the angular position of the subsequent hollow bodies in a compensation zone upstream of said measurement zone as a function of the angular offset measured for the at least one particular hollow body.

20 Claims, 12 Drawing Sheets

(52) U.S. Cl.
CPC ...... *B29C 49/78* (2013.01); *B29C 2049/7878* (2022.05); *B29L 2031/7158* (2013.01)

(56) References Cited

U.S. PATENT DOCUMENTS

| | | |
|---|---|---|
| 2003/0077349 A1 | 4/2003 | Derouault |
| 2008/0226763 A1* | 9/2008 | Charpentier .............. B07C 5/02 425/534 |

* cited by examiner

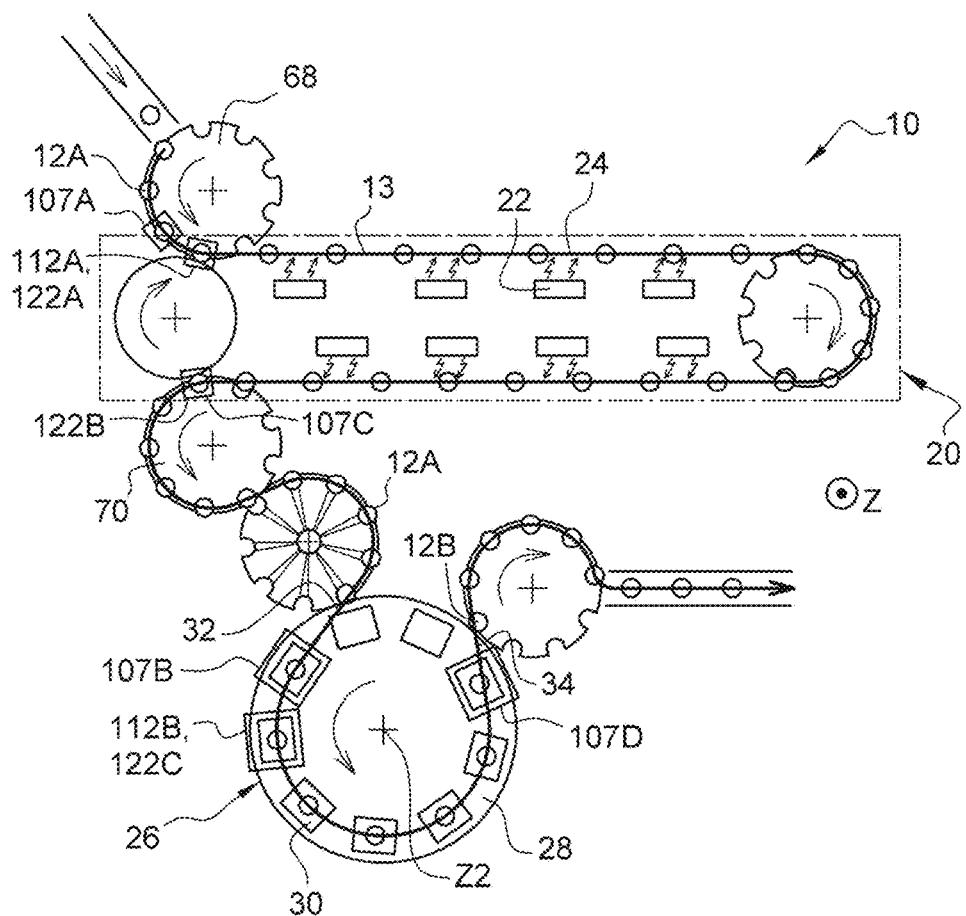
[Fig. 1]
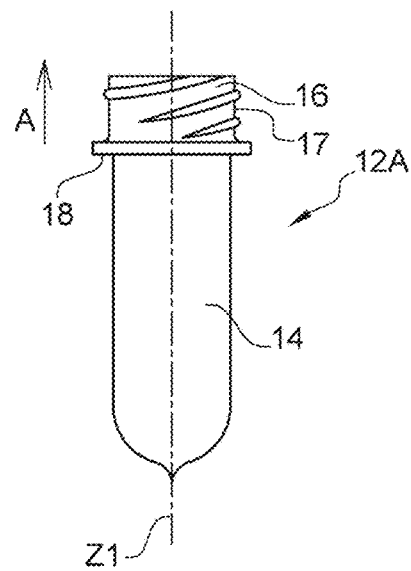
[Fig. 2]

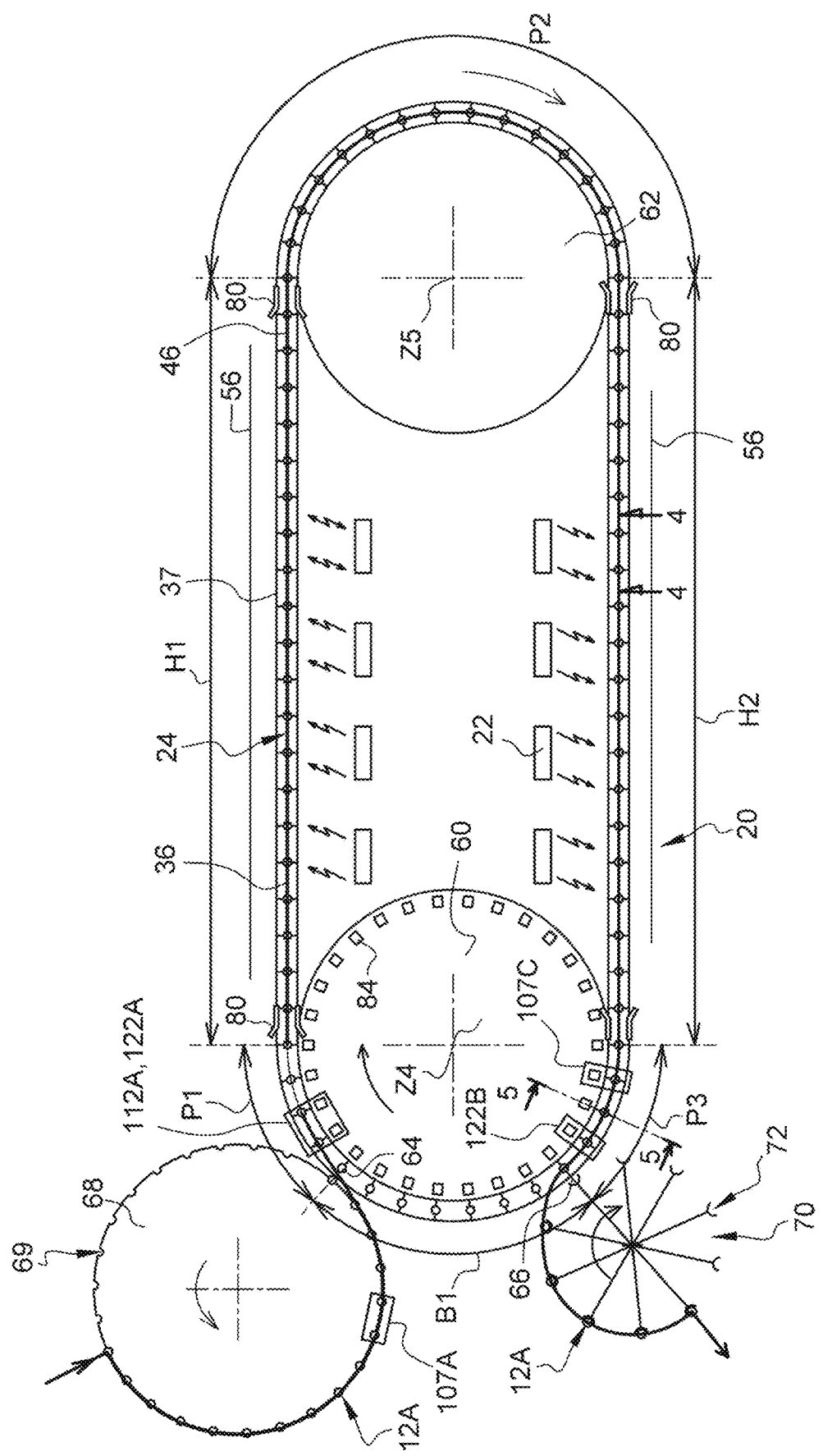
[Fig. 3]

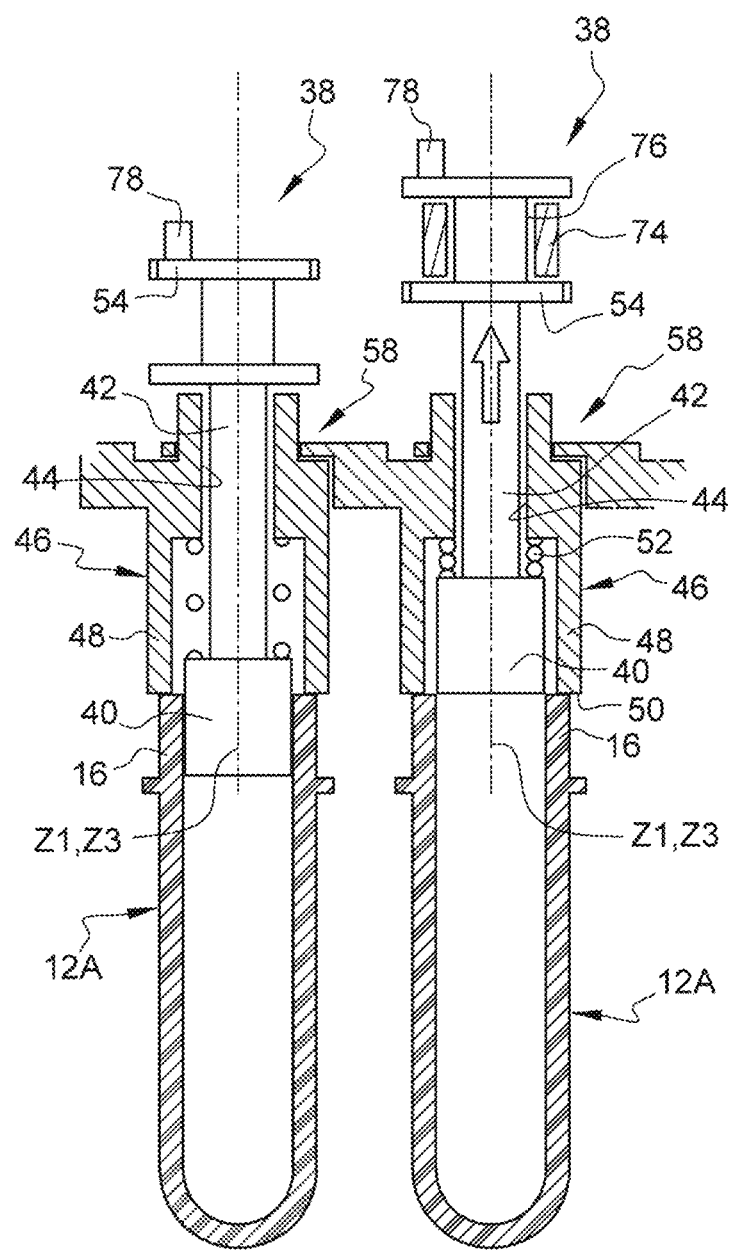
[Fig. 4]

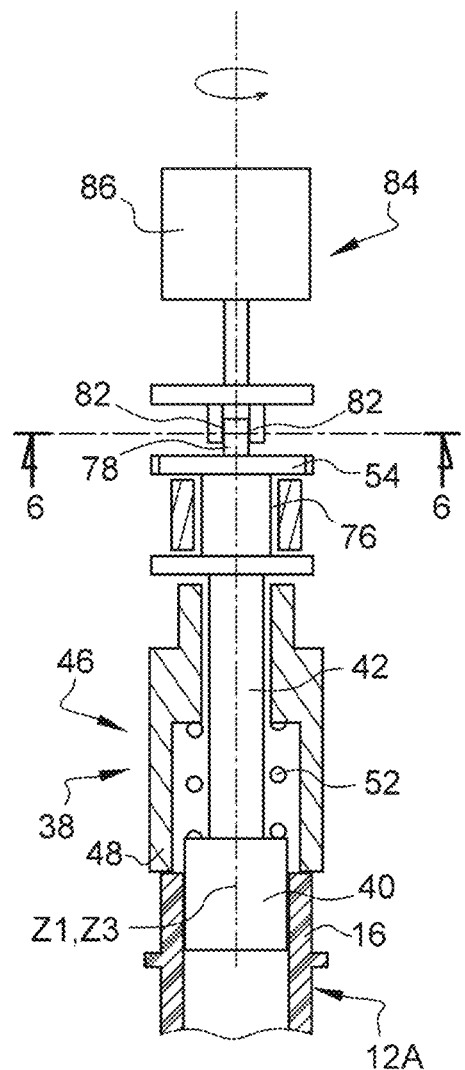
[Fig. 5]
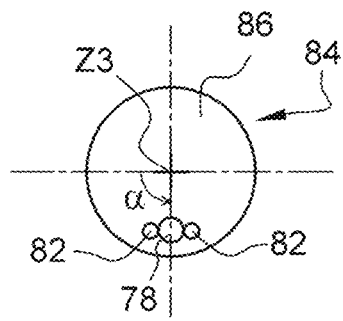
[Fig. 6]

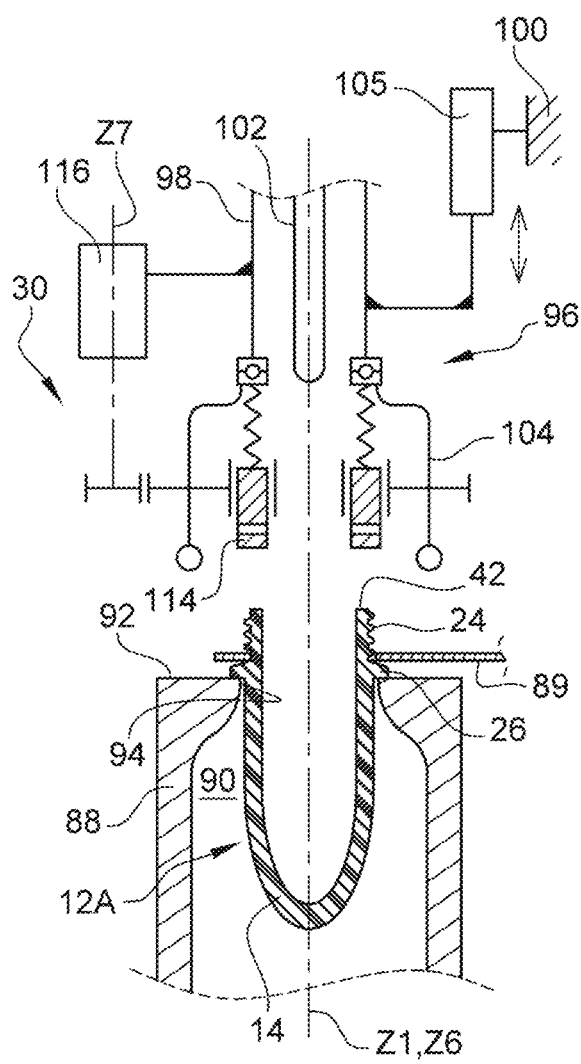
[Fig. 7]

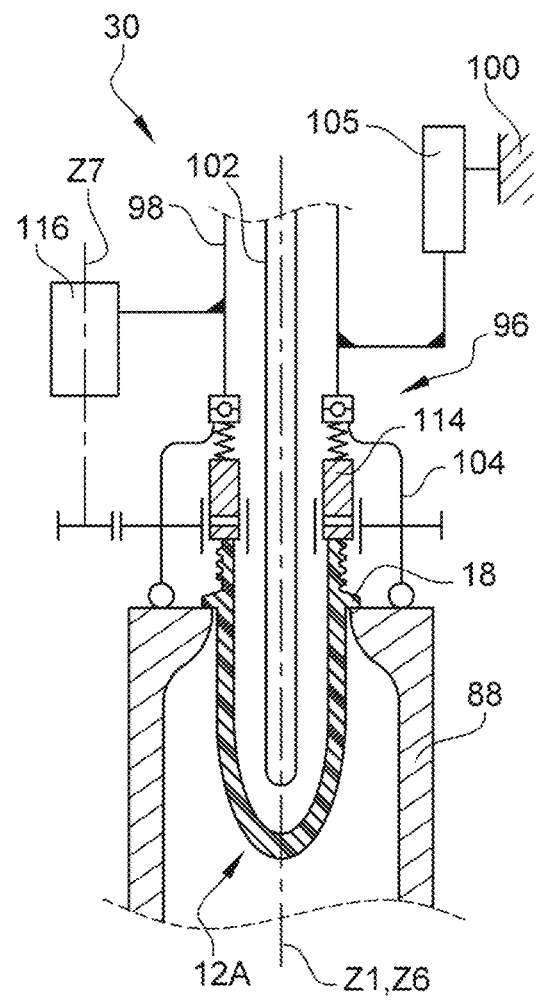
[Fig. 8]

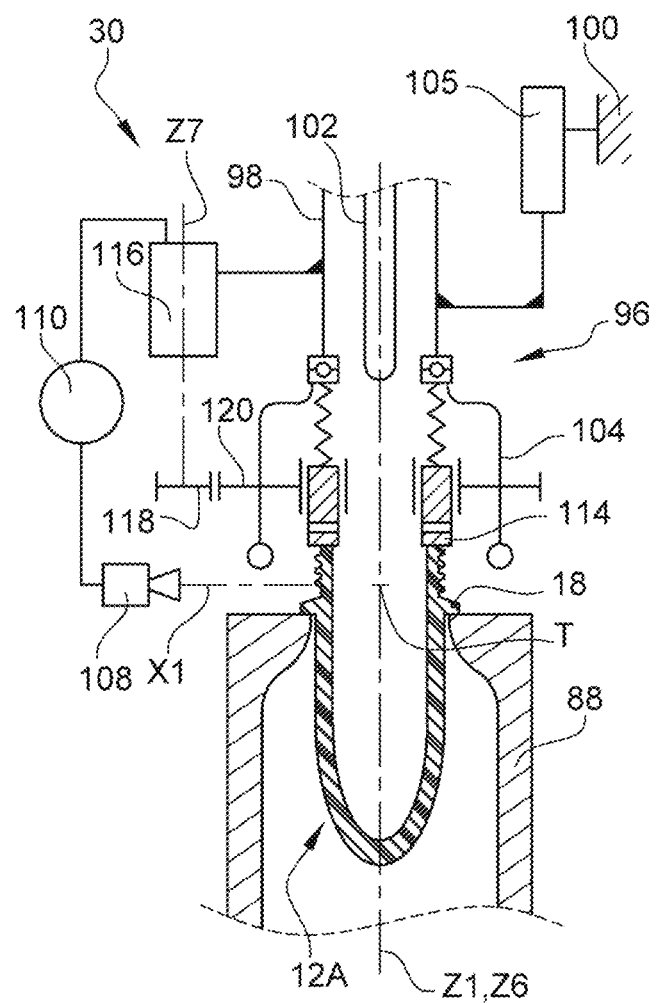
[Fig. 9]

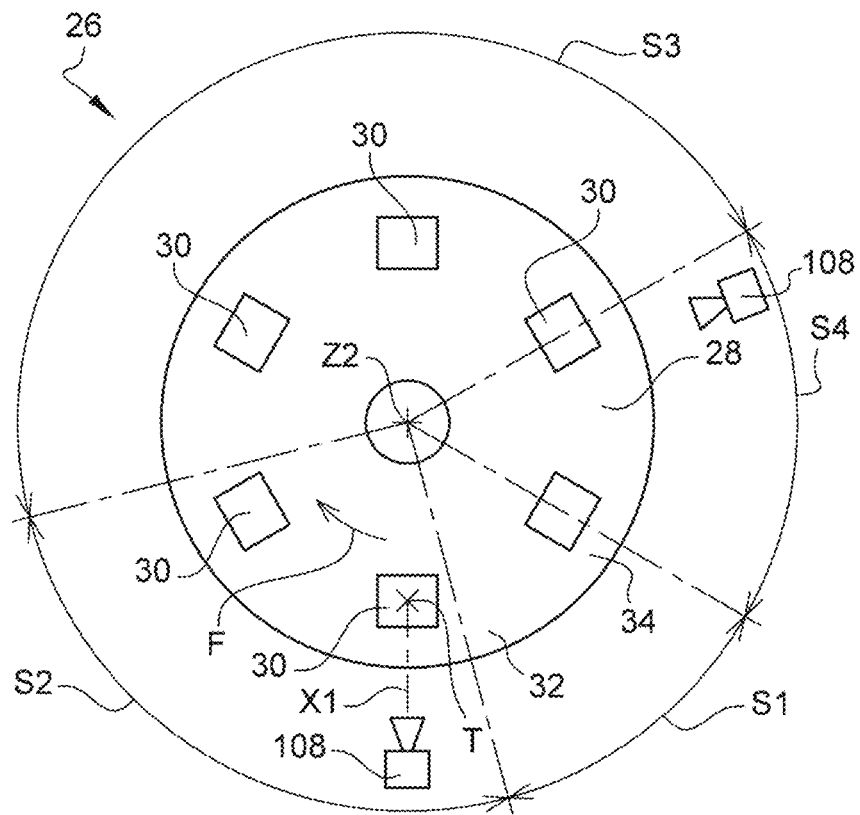
[Fig. 10]
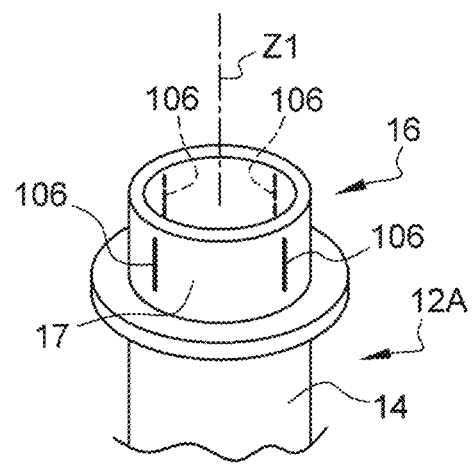
[Fig. 11]

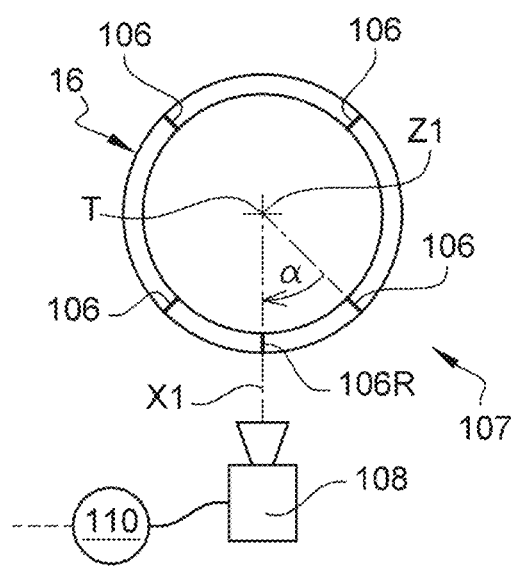
[Fig. 12]
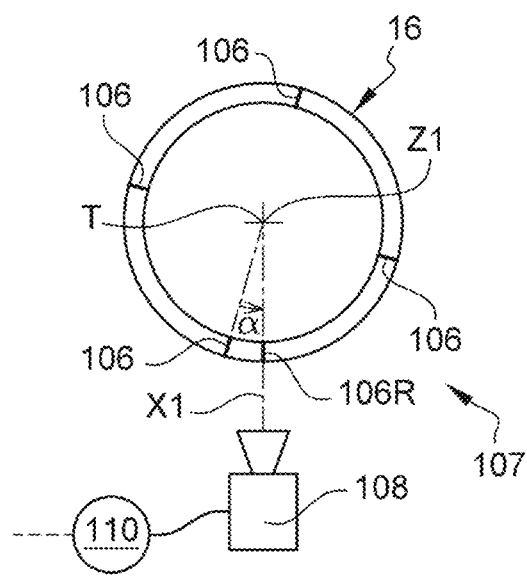
[Fig. 13]

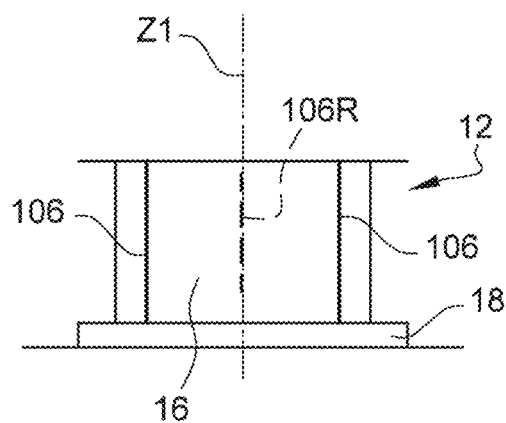
[Fig. 14]
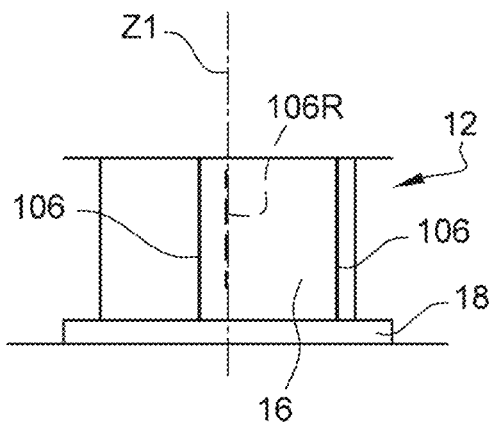
[Fig. 15]
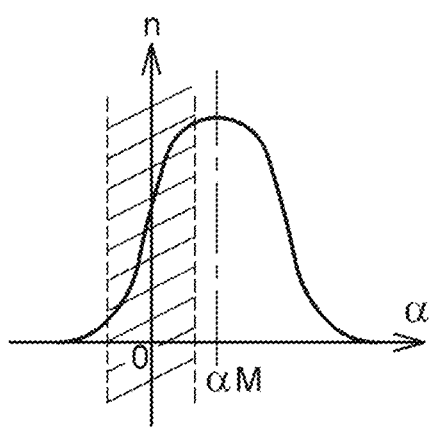
[Fig. 16]

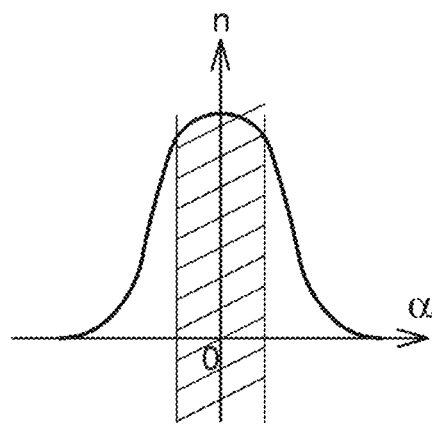
[Fig. 17]

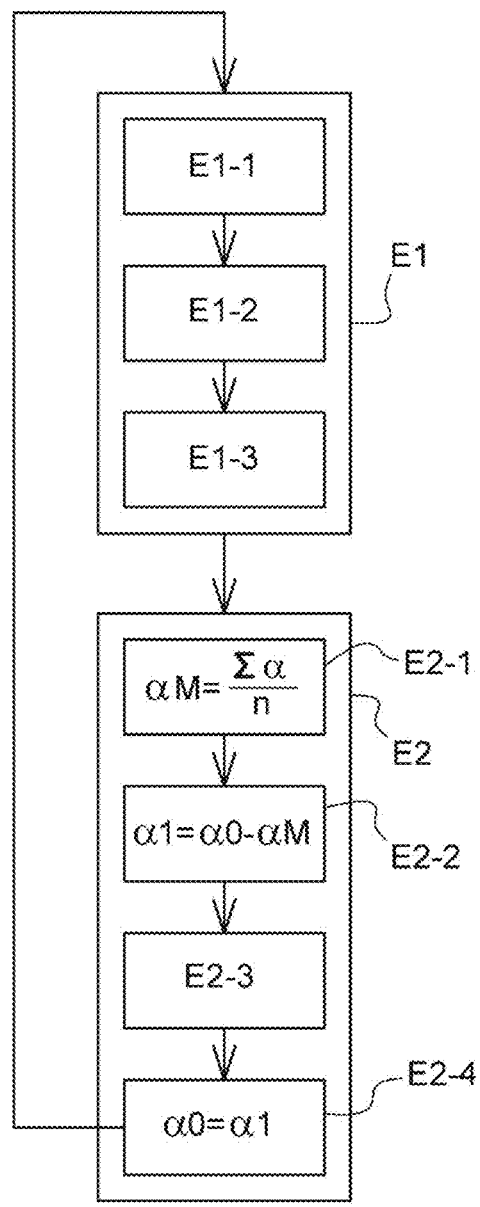
[Fig. 18]

METHOD FOR ANGULAR ORIENTATION OF HOLLOW BODIES IN A PLANT FOR MANUFACTURING CONTAINERS

TECHNICAL FIELD OF THE INVENTION

The invention concerns a method for regulation of the angular position of hollow bodies in an installation for production of containers by forming thermoplastic material preforms in which the hollow bodies are moved in single file along a production itinerary by individual support members each of which is equipped with means for causing the preform to turn about its axis, the method including a first step of measuring an angular offset of at least one particular preform relative to a reference angular position in a particular measurement zone of the production itinerary.

TECHNICAL BACKGROUND

In the remainder of the description and in the claims the term "hollow body" will interchangeably designate a preform or a container.

It is known to produce thermoplastic material and in particular polyethylene terephthalate (PET) containers by forming, and in particular by blowing-stretching, preforms the body of which is heated beforehand. The hollow bodies have a neck that is already molded to its final shape and is therefore intended to remain unchanged during the production of the container.

In many cases the preforms are produced by injection molding at a first location and are blow molded to the final shape of the container at a second location in a specific production installation.

This kind of technology enables the blow molding operation to be carried out as close as possible to the bottling location, the injection molding operation having been effected anywhere. In fact, it is relatively easy and relatively inexpensive to transport small preforms whereas transporting containers after forming has the disadvantage of low cost effectiveness because of their very large volume.

The series production of such containers is carried out in a container production installation in which the hollow bodies follow a production itinerary in single file.

To enable it to be formed, the body of the preform is heated above a glass transition temperature enabling the wall of the body to be rendered malleable. In contrast, the neck is maintained at a temperature below the glass transition temperature to prevent deformation thereof. To this end the production installation includes a heating station that enables the body of the preforms to be heated to the required temperature to carry out the forming step.

The heated preforms are then routed to a forming station of the production installation. The forming station is equipped with numerous forming substations each of which includes a mold and a device for injection of a forming fluid under pressure into a preform received in the mold. The large number of forming substations enables production of the containers at a high rate, for example greater than or equal to 50,000 bottles per hour. The forming substations are for example carried by a carousel that turns so that the preforms are blown one after the other at a high rate during their movement between an introduction point corresponding to the introduction of the preforms into an associated mold and an extraction from the mold point corresponding to the ejection of the formed containers out of the molds.

The containers obtained in this way are received when they exit the mold by holding means of a transfer wheel in order for them to be routed in single file to another device, for example via a conveyor. The next station is for example a filling station or a labeling station.

The stations themselves are generally equipped with container transport devices such as carousels. The production installation is also equipped with transport devices between two stations.

It is sometimes necessary to modify the angular orientation of the hollow bodies during their movement through the production installation.

This kind of modification of the angular orientation is necessary for example if the containers to be obtained have at least one section that it not axisymmetrical relative to the axis of the neck. To obtain this kind of non-axisymmetrical container the preforms are generally preferentially heated in certain parts, by a process generally known as "preferential heating". The preforms are then received in the molds with a particular orientation about their main axis to cause the heating profile of the bodies to correspond to the imprint of the non-axisymmetrical container to be obtained.

To guarantee that the orientation of the preforms remains under control between their entry into the heating station and their exit from the forming station the transport devices include individual support members that are designed to hold the preform in such a manner as to prevent slippage between the preform and its individual support member, in particular in order to prevent any uncontrolled rotation of the preform about its principal axis.

It is known to equip the neck of the preforms with an angular marker that enables monitoring and correction of their angular orientation about the axis of the neck relative to a support. The neck retaining its shape during the process of production of the container, this angular marker remains usable to enable orientation of the preform and of the finished container about the axis of its neck throughout the production process and during subsequent treatments.

This angular marker enables the angular orientation of the preform or of the container relative to each individual support member to be determined and possibly the angular orientation of the preform or of the individual support member to be modified to bring the angular marker into a particular reference position relative to the individual support member.

In a non-limiting manner, this kind of angular marker may be produced when injection molding the preform in the form of an angular marker in relief. It is for example a notch produced in a flange of the neck or a lug produced in a groove situated above the flange. Thus the preform is already equipped with its own angular marker before feeding the container production installation.

This kind of preform is angularly indexed a first time when it is taken up by the heating station in order to cause the heating profile to correspond to the angular marker with which the preform is already equipped.

However, when the preform is transferred from one transport device to the next transport device, it can happen that the preform undergoes uncontrolled pivoting about its principal axis relative to the individual support member. Likewise, when the preform is deposited in a mold of the forming station, it remains free to turn about its principal axis during a very short time between the moment at which it is released into the mold by the directly upstream transport device and the moment at which it is immobilized by a nozzle of the molding substation.

To alleviate this problem, the orientation of each preform is verified in a measurement zone of the production itinerary thereof and if an angular offset is detected relative to a reference angular position the orientation of said preform is corrected during a correction operation in a correction zone of the production itinerary downstream of the measurement zone, for example when it is taken up by the forming station, so that the heating profile of said preform corresponds exactly to the imprint of the mold.

In a known variant the correction is effected without measurement by turning the preform until a sensor detects that the angular marker equipping the neck is in the reference angular position.

If the preform is taken up in the heating station with an angular indexing error, its heating profile no longer coincides with its angular marker. This error persists in the mold, since the orientation of the preform in the mold is determined thanks to its angular marker. It is therefore necessary to verify the orientation of the preform in a measurement zone at the start of a heating path and then to correct the orientation of said preform downstream of the measurement zone so that its heating profile corresponds exactly to the position of the angular marker.

However each operation of correction of the position of the preform has a duration proportional to the value of the angular offset to be corrected in the correction zone. The result of this is that the production rate is limited by the correction operation.

Moreover, it happens that the heating profile is slightly offset relative to the position of the angular marker. This may be caused by slippage of the preforms between the first measurement zone and being taken up by the heating station.

SUMMARY OF THE INVENTION

The invention proposes a method of regulation of the angular position of hollow bodies in an installation for production of containers by forming thermoplastic material preforms in which the hollow bodies are moved in single file along a production itinerary by individual support members, each of which is equipped with means for causing the hollow body to turn about its axis, the method including a first step of measuring an angular offset of at least one particular hollow body relative to a reference angular position in a particular measurement zone of the production itinerary, characterized in that it includes a second step of compensation of the angular position of the subsequent hollow bodies in a compensation zone upstream of said measurement zone during which the angular orientation of the subsequent hollow bodies is modified by an updated compensation angle that is a function of the angular offset measured for the at least one particular hollow body in the first step and that is a function of a current compensation angle in such a manner as to reduce the angular offset of the hollow bodies in said measurement zone.

In accordance with other features of the invention:
the value of the current compensation angle is modified in the second step if the mean of the angular offsets of each hollow body of a string of at least two consecutive particular hollow bodies measured in the first detection step has an absolute value above a particular threshold;
in the second compensation step, the updated compensation angle is calculated by subtracting the mean of the angular offsets of the string of particular preforms from the current compensation angle;
the method is reiterated cyclically, the current compensation angle being formed by the updated compensation angle of the preceding iteration;

during the first iteration, the current compensation angle is initialized to 0°;
the installation includes a heating station that is equipped with a transport device provided with support means, termed turntables, each of which enables individual transportation of a preform along a heating path forming a section of the production itinerary and each of which enables the preform to be caused to turn about its axis, the compensation zone being arranged on the heating path where the preforms are supported by a turntable, the compensation of the angular position of the preforms being achieved by rotation of each turntable by the updated compensation angle in the compensation zone;
the transport device includes a chain of turntables movement of which is guided by two guide wheels, the compensation zone being situated in a run of the chain that meshes with one of the guide wheels;
the compensation zone is situated in a run of the chain that meshes with a guide wheel downstream of a take-up point at which the preforms are transferred from an upstream transport device and before the beginning of the heating of the preform;
the measurement zone is situated in the heating station in a run of the chain that meshes with a guide wheel upstream of a transfer point at which the preforms are transferred to a downstream transport device in the direction of a forming station and after the heating of the preform has been finished;
the production installation includes a forming station in which each hollow body is moved along a forming path forming a section of the production itinerary, each preform undergoing an operation of forming it into a final container along the forming path;
the compensation zone is situated in a run of the chain that meshes with a guide wheel upstream of a transfer point at which the preforms are transferred to a downstream transport device in the direction of a forming station and after the heating of the preform has finished;
the measurement zone is situated in the forming station downstream of the heating station before the forming operation is begun;
the compensation zone is situated along the forming path before the forming operation is begun;
the measurement zone is situated in the forming station along the forming path after the forming operation has been finished.

BRIEF DESCRIPTION OF THE FIGURES

Other features and advantages of the invention will become apparent during a reading of the following detailed description to understand which refer to the appended drawings in which:

FIG. 1 is a view from above that represents schematically an installation for production of containers from preforms;

FIG. 2 is a side view that represents a preform intended to be taken up by the installation from FIG. 1;

FIG. 3 is a view from above to a larger scale that schematically represents a heating station that is part of the production installation from FIG. 1;

FIG. 4 is a view in section taken along the section line 4-4 in FIG. 3 that represents a portion of a chain for transporting preforms through the heating station;

FIG. 5 is a view in section taken along the section line 5-5 in FIG. 3 that represents a preform carried by a turntable that is interengaged with a device for orienting the turntable;

FIG. 6 is a view in section taken along the section line 6-6 in FIG. 5 that represents a crankpin of a turntable engaged between two fingers of the orientation device;

FIG. 7 is a view in axial section that represents a forming substation equipping a forming station of the installation from FIG. 1 and in a mold of which a preform is installed, a nozzle of the forming substation occupying a retracted extreme position;

FIG. 8 is a view similar to that of FIG. 7 that represents the nozzle in a working extreme position in which it is able to inject a forming fluid into the preform;

FIG. 9 is a view similar to that of FIG. 7 in which the nozzle occupies an orientation intermediate position, a member for driving the nozzle being interengaged with the preform to enable driving thereof in rotation;

FIG. 10 is a view in elevation that represents a carousel of the forming station that carries a plurality of forming substations, the forming stations being equipped with two imaging devices;

FIG. 11 is a perspective view that represents the neck of a hollow body including four angular markers;

FIG. 12 is a view from above that represents the neck of a preform during its passage at a target point at which one of the imaging devices of the installation is aimed, the preform being oriented in accordance with a first current angular orientation;

FIG. 13 is a view similar to that of FIG. 12 that represents another preform oriented in accordance with a second current angular orientation;

FIG. 14 represents an image of the neck of the preform from FIG. 12 captured from the side by the imaging device from FIG. 12;

FIG. 15 represents an image of the neck of the preform from FIG. 13 captured from the side by the imaging device from said FIG. 13;

FIG. 16 represents a diagram representing on the abscissa axis the angular offset measured between the current angular position of a hollow body and a reference angular position and representing on the ordinate axis the number of hollow bodies having said angular offset, a curve representing the distribution of the angular offsets for a string of several hollow bodies, the mean of the angular offsets being offset relative to the value 0°;

FIG. 17 represents a diagram similar to that from FIG. 16 in which the mean of the angular offsets is equal to 0°;

FIG. 18 is a block schematic that represents the compensation method carried out in accordance with the teachings of the invention.

DETAILED DESCRIPTION OF THE INVENTION

In the remainder of the description elements having an identical structure or analogous functions will be designated by the same reference.

There has been represented in FIG. 1 an installation 10 for production of containers 12B from preforms 12A. Hereinafter and in the claims the preforms 12A and the containers 12B will be designated interchangeably by the generic term hollow body 12. In the remainder of the description the terms "upstream" and "downstream" will be used with reference to the direction of movement of the hollow bodies 12 in single file along a production itinerary 13.

The invention is intended to be applied when the production installation 10 produces containers 12B.

Here the production itinerary 13 extends in a globally horizontal plane while the hollow bodies 12 have a principal axis "Z1" that extends vertically, that is to say orthogonally to the horizontal plane.

The hollow bodies 12 are moved in a continuous manner through the production installation 10 along the production itinerary 13 that is indicated in bold line in FIG. 1. The hollow bodies 12 are moved by various transport devices, some of which will be described in detail hereinafter, that include individual support members for each hollow body 12. The transport devices are arranged as a chain in such a manner that each hollow body 12 is able to be transferred from one transport device to another to continue the production itinerary 13 while being continuously held by at least one individual support member.

In the remainder of the description angular values are expressed in degrees.

There has been schematically represented in FIG. 1 the installation 10 for series production of thermoplastic material containers 12B from preforms 12A. In a non-limiting manner here the containers 12B are bottles. Here the thermoplastic material is polyethylene terephthalate, designated hereinafter by its acronym "PET".

There has been represented in FIG. 2 an example of a hollow body 12, here in the form of a preform 12A. A preform 12A of this kind is made of a thermoplastic material, here of polyethylene terephthalate (PET). The preform 12A is globally axisymmetrical and has a principal axis "Z1" represented vertically in FIG. 2. It includes a body 14 having a closed axial end, represented at the bottom in FIG. 2. The opposite end of the body 14, represented at the top in FIG. 2, leads into an open neck 16. The neck 16 has a tubular shape the principal axis of which defines the principal axis "Z1" of the preform 12A.

The general shape of the body 14 is that of an axisymmetrical elongate tube extending along the principal axis "Z1". The neck 16 of the preform also includes an annular flange 18 that projects radially. The neck 16, including the flange 18, is delimited on the outside by an external face 17.

A portion of the external face 17 of the neck 16 has a globally cylindrical shape. It generally includes means for fixing a cap, for example a thread or a groove for elastically nesting with the cap. Referring to FIG. 1, the production installation 10 includes a station 20 for heating the preforms 12A. By way of non-limiting example a heating station 20 includes heating members 22 emitting heating electromagnetic radiation, for example infrared radiation, such as halogen lamps or laser emitters. Reflectors (not represented) are generally arranged facing each heating member 22 on either side of the heating path to enable reflection of the heating radiation in the direction of the preforms.

As will be explained in more detail hereinafter, the heating station 20 includes a device 24 for transporting hollow bodies 12 in the form of preforms 12A that causes them to move along the heating members 22. The direction of movement of the preforms 12A is indicated by the arrows in FIG. 1.

At the exit from the heating station 20 the body 14 of the preforms 12A is rendered malleable by heating above a glass transition temperature while the neck 16 is maintained at a temperature sufficiently low to retain its original shape.

The production installation 10 also includes a station 26 for forming the heated preforms 12A into finished containers 12B. The forming station 26 is downstream of the heating station 20 with reference to the flow of hollow bodies 12 along the production itinerary 13.

Here the forming station 26 includes a carousel 28 carrying a plurality of forming substations 30. The carousel 28 is mounted to rotate about a central axis "Z2". Each forming substation 30 can therefore be moved around the axis "Z2" of the carousel 28 between a point 32 for introduction of the hot preforms 12A and a point 34 for extraction of the finished containers 12B from the mold before resuming a new cycle. The forming substations 30 will be described in more detail hereinafter.

Referring to FIG. 3, the heating station 20 has been represented in more detail. The transport device 24 enables the preforms 12A to be moved in single file along a heating path 36 that is indicated in thicker line in FIG. 3. The heating path 36 forms a section of the production itinerary 13.

The transport device 24 includes a string of individual support members 37 referred to hereinafter as "turntables 38", each of which is able to support an individual preform 12A.

As represented in FIG. 4, this kind of turntable 38 includes a mandrel 40 that is temporarily fastened to the neck 16 of a preform 12A, for the time taken to transport it along the heating path 36. The preform 12A is in particular immobilized against rotation about its principal axis "Z1" relative to the mandrel 40.

The mandrel 40 is for example forcibly driven into the neck 16 of the preform 12A which is therefore temporarily fastened to the mandrel 40 by friction. The necessary friction is for example provided by an elastomer material ring (not represented) disposed in a groove around the mandrel 40.

The mandrel 40 is fixed to the lower end of a shaft 42 with axis "Z3" coaxial with the principal axis "Z1" of the preform 12A it carries. The shaft 42 is received in a guide bearing 44 of a link 46 of the transport device 24. The shaft 42 is more particularly mounted to rotate in the guide bearing 44 about its principal axis "Z3". That rotation advantageously makes it possible to be able to expose the whole of the body 14 of the preform 12A to the heating radiation emitted by the heating members 22 in a controlled manner.

Moreover, here the shaft 42 is mounted to slide vertically relative to the link 46. The link 46 includes a lower sleeve 48 that has an annular lower end face 50 termed the "stripping face 50". The shaft 42 is therefore mounted to slide between the active lower position, as represented on the left in FIG. 4, in which the mandrel 40 can be fastened to the neck 16 of the preform 12A, and an inactive upper position, as represented on the right in FIG. 4, in which the mandrel 40 is retracted into the sleeve 48, above the lower end face 50, to enable the mandrel 40 to be unfastened from the neck 16 of the preform 12A, which remains immobilized outside the sleeve 48 by abutting against the stripping face 50.

In a non-limiting manner, here the mandrel 40 is driven toward its inactive position by means of a cam device (not represented) and urged toward its active position by an elastic member 52, here a spring, disposed vertically between the mandrel 40 and the link 46.

Here the rotation of the mandrel 40 about the principal axis "Z1" of the preform 12A is driven by means of pinion 54 that here is arranged at an upper end of the shaft 42, above the link 46. The pinion 54 is intended to cooperate with a rack 56 that is disposed over at least a section of the heating path 36.

In a variant of the invention that is not represented the rotation of the mandrel 40 is driven by an individual electric motor on the link 46. This rotation is then controlled by an electronic control unit. Here each link 46 carries a single turntable 38. The links 46 are assembled in a manner articulated to one another as a chain around the principal axis "Z3" by means of a hinge 58. Thus the links 46 are assembled to form the closed chain 37.

The chain 37 is meshed around a first guide wheel 60 and a second guide wheel 62 each of which is mounted to rotate about a vertical axis "Z4, Z5". At least one of the guide wheels 60, 62 is driven, here clockwise, by at least one motor (not represented) to enable driving of the chain 37.

Here each turntable 38 is moved continuously, that is to say without interruption, along a closed circuit. A usable section of said closed circuit, represented in thicker line in FIG. 3, forms the heating path 36 along which each turntable 38 is intended to carry a preform 12A. An empty section, which the turntables 38 travel empty, completes the circuit.

On the heating path 36 each turntable 38 transports a preform 12A from a point 64 where the preforms 12A are taken up to a point 66 at which the preforms 12A are transferred to the forming station 26. The take-up point 64 and the transfer point 66 are at the periphery of the first guide wheel 60.

The preforms 12A are fed one by one to the take-up point 64 by an upstream transport device, for example by means of a notched wheel 68. At the take-up point 64 each mandrel 40 is inserted in the neck 16 of a preform 12A fed by the notched wheel 68. The notched wheel 68 is provided with notches 69 at its periphery each of which is intended to support one preform 12A.

On leaving the heating path 36 the hot preforms 12A are transferred to a downstream transport device, for example a transfer wheel 70 that here is equipped with clamps 72 that are intended to seize each preform 12A by its neck 16. The turntables 38 are then driven toward their inactive position by means of a driving fork 74 which can be seen in FIG. 4 and which here is carried by the first guide wheel 60. Each driving fork 74 is mounted to slide vertically. The sliding of each driving fork 74 is driven for example by a cam (not represented). The first guide wheel 60 more particularly includes a plurality of forks 74 at its periphery. A groove 76 on each turntable 38 is intended to be interengaged with a fork 74 to drive sliding thereof, as illustrated in FIG. 4.

In the empty section the empty turntables 38 move from the transfer point 66 to the take-up point 64. The empty section is on a run "B1" of the chain 37 that meshes around the first guide wheel 60.

The heating path 36 includes at least one active section along which the body 14 of the preform 12A is exposed directly to the heating radiation from the heating members 22, symbolized by arrows shaped like lightning bolts in FIG. 3, and at least one passage section along which the body 14 of the preform 12A is not exposed to the heating radiation from the heating members 22.

In the example illustrated in FIG. 3 the heating station 20 includes an upstream active section "H1", sometimes termed the "penetration" section, and a downstream active section "H2", sometimes termed the "distribution" section, that are formed by two rectilinear runs of the transport chain 37 tensioned between the two guide wheels 60, 62. The heating members 22 are arranged along these two active sections "H1, H2" in such a manner that the bodies 14 of the preforms 12A traveling along these active sections "H1, H2" are exposed to the heating radiation. The preforms 12A are generally driven in rotation about their principal axis "Z1" when they travel through the active heating sections "H1, H2" to enable heating of the body 14 of the preforms 12A over all their circumference. To this end each section "H1, H2" includes a rack 56 for driving the turntables 38 in rotation.

Here the heating path 36 includes three passive sections along which the body 14 of the preforms 12A is not exposed to the heating radiation emitted by the heating members 22. Here there is no heating member in the passive sections.

An upstream first passive section "P1" is arranged between the take-up point 64 and the upstream active section "H1". The upstream first passive section "P1" is therefore situated on a run of the chain 37 that meshes with the first guide wheel 60.

An intermediate second passive section "P2" is interleaved between the upstream active section "H1" and the downstream active section "H2". The intermediate second passive section "P2" more particularly has a circular arc shape because it extends over a run of the chain 37 that is meshed around the second guide wheel 62.

The downstream third passive section "P3" is arranged between the downstream end of the downstream active section "H2" and the transfer point 66. The downstream third passive section "P3" is therefore situated on a run of the chain 37 that meshes with the first guide wheel 60.

Protection members (not represented) are provided to protect the necks 16 of the preforms 12A from the heating radiation in order to maintain the necks 16 at a temperature below the glass transition temperature.

The orientation of each turntable 38 is controlled all the way along the heating path 36. In the embodiment represented in the figures, especially in FIG. 4, each turntable 38 here includes a crank pin 78 that is arranged in an eccentric manner relative to the rotation axis "Z3". The crank pin 78 is intended to enable correct orientation of the turntable 38 on passing from each passive section "P1, P2, P3" to the next active section "H1, H2" between a set 80 of two convergent ramps disposed along the path of the turntable 38. Thus the crank pin 78 is automatically positioned toward the upstream side relative to the direction of movement of the turntables 38. At the exit from this set 80 of convergent ramps the pinions 54 mesh directly with the rack 56 so that the orientation of the turntables 38 can be readily deduced from its position along the heating path 36 as long as the pinion 54 is interengaged with the rack 56.

When the turntables 38 arrive at the level of the first guide wheel 60 the crank pin 78 is received between two fingers 82 of an orientation device 84 that is carried by the first guide wheel 60. The orientation device 84 also includes a motor 86 that enables the fingers 82 to be caused to turn about the axis "Z3" relative to the first guide wheel 60 so as to be able to orient the turntables 38 around their axes "Z3", as illustrated in FIGS. 5 and 6. The first guide wheel 60 therefore includes a plurality of orientation devices 84 at its periphery in such a manner that each turntable 38 is taken in charge by an orientation device 84 on the meshing run.

In a variant of the invention that is not represented the racks and/or the orientation devices may be replaced by an individual motor for driving in rotation the turntable 38 that is carried by each link 46.

The parameter settings of each heating member 22 can be controlled so as to heat some portions of the body 14 of the preform 12A either more or less. The parameters that can be adjusted comprise for example the position of each heating member 22 relative to the heating path 36 and/or the power of the radiation emitted by each heating member 22 and/or the opacity of the reflectors facing some heating elements 22. The parameters are for example controlled automatically by an electronic control unit. Accordingly, by simultaneously controlling the orientation of the turntable 38 and the power of the heating radiation at every point of the heating path 36 it is possible to heat the body 14 of the preform 12A in accordance with a so-called "preferential" heating profile that thereafter makes it possible to confer a non-axisymmetrical shape on the finished container 12B during the forming operation.

The heated preform 12A is then sent to a forming substation 30 of the forming station 26 by means of the transfer wheel 70 which transfers the preforms to another, directly downstream transport device which here is formed by a second transfer wheel 87 itself equipped with clamps 89 for individually grasping each preform 12A.

In a variant of the invention that is not represented a single transfer wheel transports the preforms between the heating station and the forming station.

As explained above, the forming substations 30 are carried by a rotary carousel 28. In production the carousel 28 turns continuously. It therefore enables movement of the preforms 12A/containers 12B along a forming path that forms a section of the production itinerary 13.

A forming substation 30 of this kind equipping the forming station 26 is shown in more detail in FIG. 7. In known manner the forming substation 30 includes a forming mold 88 that is generally made up of two or three parts mobile relative to one another to enable a clamp 89 of the directly upstream transport device, here the second transfer wheel 87, to introduce the hot preform 12A into a molding cavity 90 formed inside this mold 88 and to enable the container 12B to be extracted from the mold 88 after the forming operation. When the parts of the mold 88 are assembled the mold 88 has a globally plane upper face 92 through which passes a through-orifice 94 with vertical axis "Z6" that opens vertically into the molding cavity 90. Thus each mold 88 forms an individual support member for a preform 12A enabling it to be transported along the forming path.

The forming station 30 also includes a device 96 for injection of a forming fluid, for example air, under pressure. The injection device 96 includes a nozzle 98 that is arranged vertically above the mold 88 and is intended to be caused to slide vertically downward on the axis "Z6" of the passage orifice 94 facing the neck 16 of the preform 12A in order to inject into it air under pressure and thus to force the material of the body 14 of the preform 12A to deform and to espouse the shape of the molding cavity 90.

In accordance with a known design of the injection device 96, the nozzle 98 has a tubular shape. It is mobile vertically in a fixed nozzle-carrier block 100 of the forming substations 30. The nozzle 98 has passing through it along the axis "Z6" a stretcher rod 102 that is driven vertically by a cylinder, an electric motor or a cam/roller device (none of which is represented) to be engaged in the preform 12A and to guide the vertical deformation of the latter during forming, in particular by blowing.

In the example illustrated the forming substation 30 is equipped with a bell nozzle 98 comparable to that described in French patent FR-2.764.544. Thus the nozzle 98 is provided at its lower end with a bell-shaped part 104 that is open at its lower end so as to come to bear in sealed manner on the upper face 92 of the mold 88 around the neck 16 of the preform 12A, as represented in FIG. 8, and not to bear on the latter. Once the bell 104 is pressing on the mold 88 the nozzle 98 is in fluid-tight communication with the interior of the preform 12A in order to inject gas under pressure into it.

In a variant that is not represented the lower end of the nozzle 98 comes into fluid-tight contact with the neck 16 of the preform 12A to inject gas under pressure.

The nozzle 98 and therefore the bell 104 can be positioned vertically between two extreme positions.

In FIG. 7 the nozzle 98 is in a first extreme position termed the "retracted extreme position" in which it enables loading of the preform 12A into the mold 88 and then extraction of the container 12B once formed. In this retracted extreme position the bell 104 is spaced vertically above the upper face 92 of the mold 88.

In FIG. 8 the nozzle 98 is illustrated in a second extreme position termed the "working extreme position" in which the bell 104 bears in fluid-tight manner on the upper face 92 of the mold 88, encompassing the passage orifice 94 and the neck 16.

The movements of the nozzle 98 between its two extreme positions may be driven in various ways. The sliding of the nozzle 98 is for example driven by means of a linear electric motor 105. In a variant of the invention that is not represented the sliding of the nozzle is driven with the aid of a multistage pneumatic actuator system.

The nozzle 98 includes a drive member 114 that enables the preform 12A to be held firmly in position when installed in the mold 88 during the forming operation, in particular when the forming fluid under pressure is introduced into the preform 12A. The drive member 114 is spaced vertically from the preform 12A when the nozzle 98 occupies its retracted extreme position. The drive member 114 is intended to come into contact with the installed preform 12A when the nozzle 98 is moved vertically from its retracted extreme position to a particular intermediate position between its two extreme positions, termed the orientation intermediate position, which is illustrated in FIG. 9, in which the bell 104 is moved toward the upper face 92 of the mold 88 without coming into contact with the upper face 92 of the mold 88. In this way at least a lower section of the neck 16 of the preform 12A remains visible from the outside.

The forming substations 30 are arranged on a common circular trajectory centered on the central axis "Z2". During their movement the forming substations 30 therefore drive the hollow bodies 12 continuously along the forming path of circular arc shape, forming a section of the production itinerary 13. The circular trajectory of the forming substations 30 is generally divided into four distinct sectors, as represented in FIG. 10.

In a so-called offloading and loading sector "S1" the nozzle 98 is in its retracted extreme position to enable the introduction of a preform 12A into the mold 88; for example the preform 12A is positioned by means of a clamp 89 as illustrated in FIG. 7. Then in a second sector "S2" directly downstream of the first sector "S1" the nozzle 98 is in its orientation intermediate position. The clamp 89 is then withdrawn.

In a third or blowing sector "S3" the nozzle 98 occupies its working extreme position to enable forming of the preform 12A into the finished container.

On leaving the third sector "S3" the forming substation 30 enters a fourth or verification sector "S4" in which the nozzle 98 is in its orientation intermediate position.

On the leaving the fourth sector "S4" the forming substation 30 returns directly to the first sector "S1" in which the nozzle 98 is in its retracted extreme position to enable extraction of the finished container and insertion of a new preform 12A to begin a new forming cycle.

As explained in the preamble, in some applications it is necessary to orient the hollow body 12 before carrying out a treatment. For example, a preform 12A heated in accordance with a "preferential" heating profile will have to be oriented in correspondence with the shape of the mold in the forming substations 30. To this end, as illustrated in FIG. 11, it is known to produce at least one angular marker 106 on the neck 16 of the preform 12A, as the neck 16 does not undergo any transformation.

The angular marker 106 is for example formed in relief, such as a lug or a notch produced on the neck 16. It may also be a mark produced by local heating or by printing.

An angular offset "α" between the current angular position of the preform 12A and a reference angular position is for example measured in at least one so-called measurement zone 107 of the production itinerary 13. The angular offset "α" is thus an angle that is measured around the principal axis "Z1" of the neck 16 of the hollow body 12. When the preform 12A travels along the heating path the reference angular position corresponds to the angular position that the preform 12A should occupy around its principal axis "Z1" relative to its support member in order for the heating profile to coincide with the angular marker 106. When the hollow body 12 travels along the forming path the reference angular position corresponds to the angular position that the hollow body 12 should occupy around its principal axis "Z1" relative to the mold in order for the angular marker 106 and therefore the heating profile to coincide with the shape of the molding cavity 90.

In the context of the present patent the angular offset "α" is here defined as being oriented, that is to say is between −180° and +180° inclusive, the value 0° corresponding to an angular position of the hollow body 12 corresponding to its reference angular position.

Here the production installation 10 includes a plurality of measurement zones 107. The structure and the functioning of a measurement zone 107 will be described generically hereinafter with reference to FIGS. 12 and 13, the description being applicable to all the measurement zones 107 of the production installation 10. Thereafter each measurement zone 107 will be distinguished by adding to the reference 107 a letter associated with each of those measurement zones.

Each measurement zone 107 is equipped with a set of at least one device 108 for imaging the neck 16 of the hollow body 12. The imaging device 108 is for example a digital video or still camera. The imaging device 108 is arranged in such a manner as to capture a digital image in which the angular marker 106 on the neck 16 of the hollow body 12 can be seen. There may also be provided means (not represented) for illuminating the neck 16 to guarantee a sharp image of the neck 16 when imaging. The illuminating means are for example integrated into the imaging device 108.

The imaging device 108 is designed automatically to communicate an image of the neck 16 of the hollow body 12 to an electronic control unit 110 in order to be able to execute a step "E1" of measuring the angular offset "α" of the particular hollow body 12 relative to the reference angular position in the measurement zone 107 of the production itinerary 13.

The measurement step "E1" includes a first phase "E1-1" of capture of at least one image of the neck 16 of the hollow body 12 on its support member by the imaging device 108, which is at a predetermined position relative to the production itinerary 13 during imaging. Images of this kind are for example illustrated in FIGS. 14 and 15.

The field of view of the imaging device 108 takes the overall form of a cone with a principal axis termed the imaging axis "X1". The imaging device 108 is arranged in such a manner that, at the moment of capturing an image, its imaging axis "X1" is oriented toward the neck 16 in such a manner as to capture an image in which the external face 17 of one side of the neck 16 appears. In the example represented in FIGS. 12 and 13 the imaging axis "X1" is arranged globally radially relative to the principal axis "Z1" of the neck 16 of the hollow body 12, at the same level as the neck 16.

In a variant of the invention that is not represented the imaging axis "X1" has another orientation, for example coaxial with the principal axis "Z1" of the neck 16 of the hollow body 12.

The imaging device 108 is fixed relative to the floor and its imaging axis "X1" is oriented toward a particular target point "T", also fixed relative to the floor, of the production trajectory. The target point "T" corresponds to the location at which the neck 16 of a hollow body 12 is situated in the measurement zone 107.

The imaging device 108 is therefore able to render automatically "on the fly" the image of the neck 16 when it passes the target point "T" on the imaging axis "X1" of the imaging device 108. Accordingly, a single set of at least one imaging device 108 is sufficient to capture an image of the neck 16 of each of the hollow bodies 12 passing in single file through the measurement zone 107.

If said measurement zone 107 is covered by only one imaging device 108 the imaging axis "X1" of which is oriented radially, it is preferable for the hollow body 12 to be equipped with at least two diametrically opposite angular markers 106 so as to guarantee that at least one of the angular markers 106 appears in the captured image. In the examples represented in FIGS. 11 to 15 the neck 16 of the hollow body 12 includes four regularly distributed angular markers 106. If the heating profile features a pattern repeated every 90°, as is the case here, the four angular markers may be identical.

Alternatively, if the imaging axis "X1" is arranged coaxially with the principal axis "Z1" of the neck 16, for example if the angular marker 106 is situated on the flange, the neck 16 may include only one angular marker 106 visible to a single imaging device situated on the principal axis "Z1" of the neck 16.

Alternatively, the measurement zone 107 includes a set of imaging devices 108 that are fixed relative to the floor. The imaging axis "X1" of each of the imaging devices 108 is oriented toward the principal axis "Z1" of the neck 16 of a hollow body 12 passing said target point "T". This enables each of the imaging devices 108 to capture the same neck 16 simultaneously from different angles. Accordingly, if the imaging devices 108 are disposed in such a manner as together to cover the whole of the cylindrical external face 17 of the neck 16, the neck 16 may be equipped with only one angular marker 106.

The imaging device 108 is able to communicate the captured image of the neck 16 to the electronic unit 110, for example over a wired link or by means of an appropriate electromagnetic signal. During a second processing phase "E1-2" of the measurement step "E1" each image captured by the set of at least one imaging device 108 is computer processed to detect the angular position of an angular marker 106 visible on the image relative to the reference angular position. To this end, the electronic control unit 110 is provided with image processing software that enables identification of the angular marker or markers 106 appearing in the image.

Once the position of the angular markers 106 has been identified in the image, a third phase "E1-3" is triggered during which the angular offset "α" of the hollow body 12 is determined by the electronic control unit 110.

As illustrated in FIGS. 14 and 15, the position of the imaging device 108 being fixed, the location, termed the "reference point 106R", at which one of the angular markers 106 in the image should be situated so that the hollow body 12 occupies its reference angular position, does not vary. This reference point 106R is determined before the method commences. The electronic control unit 110 calculates the angular offset "α" as a function of the transverse distance between this reference point 106R and the current position of the angular marker 106 identified in the image. As a function of the current position of the angular marker 106 relative to the reference point 106R, to the right or to the left as illustrated in the figures, the electronic unit 110 also determines the direction of the angular offset "α" relative to the reference position.

The production installation 10 represented in FIG. 1 includes at least two measurement zones 107 of this kind equipped with imaging devices 108 of this kind.

A first measurement zone 107A is located at the periphery of the notched wheel 68, just before the preforms 12A are taken up by a turntable 38.

The position of each preform 12A is then corrected individually during a correction operation as a function of the angular offset "α" measured for said preform 12A in a first correction zone 112A downstream of the first measurement zone 107A.

The first correction zone 112A is in the passive first section "P1" of the heating path, after the preform 12A has been taken up by a turntable 38. Thus the orientation devices 84 of the first guide wheel 60 enable correct orientation of the turntable 38 in such a manner as to cause the angular position of the crank pin 78 to correspond to a particular angular position of the angular marker 106 of the preform 12A. This therefore enables the heating profile of the preform 12A to be caused to coincide with the angular marker 106.

The second measurement zone 107B is located in the second angular sector "S2" just after where a preform 12A has been installed in a mold 88. Thus the orientation of the preform 12A can be corrected during a correction operation after its installation in the mold 88 in a second correction zone 112B downstream of the second measurement zone 107B, and here still in the second angular sector "S2", in order to make the position of the angular marker 106 and therefore of the heating profile correspond exactly to the shape of the molding cavity 90.

The angular position of the preform 12A is for example corrected by means of a rotary nozzle 98 like that described in the document EP 1 261 471 B1.

The drive member 114 is mounted to turn about the axis "Z6" relative to the mold 88 in such a manner as to be able to drive the preform 12A in rotation about its principal axis "Z1" when it occupies its orientation intermediate position. The drive member 114 can be driven in rotation in both directions in a controlled manner by a motorized rotation drive means, for example an electric motor 116. The electric motor 116 is controlled automatically by the electronic control unit 110, as illustrated in FIG. 9.

In a non-limiting manner, in the example represented in the figures the drive member 114 is constrained to rotate with the bell 104 about the axis "Z6", which bell is able to turn about that axis "Z6" relative to the nozzle 98 to the lower end of which it is fixed. On the other hand, the bell 104 is fastened to the nozzle 98 in the vertical direction. The drive member 114 is able to slide vertically relative to this assembly when the nozzle 98 is moved from its orientation intermediate position to its working extreme position.

For example, the drive member 114 is guided as it slides in the bell 104 by internal splines of the bell 104 which also guarantee that the bell 104 and the drive member 114 are constrained to rotate together about the axis "Z6".

When the nozzle 98 is in its orientation intermediate position illustrated in FIG. 9 it can be driven in rotation by the drive device. This drive device essentially comprises the electric motor 116 (together with its control module) that drives the rotation of a meshing gear 118 the axis "Z7" of which is parallel to the axis "Z6". Here the electric motor 116 is fastened to the nozzle-carrier block 100.

The bell 104 includes an external toothed wheel 120 that meshes with the pinion 54 so that the motor 116 is able to turn the bell 104 and via the latter the drive member 114.

The operation of the production installation 10 is described next for a particular preform 12A.

When the production installation 10 is producing containers 12B the preform 12A is first taken up by a notch of the notched wheel 68. The angular position of the preform 12A is measured in the first measurement zone 107A. Each turntable 38 is then oriented in the first correction zone 112B as a function of the angular offset "α" of said preform 12A measured in the first measurement zone 107A by the orientation device 84 before taking up a preform 12A associated with the take-up point 64 of the heating station 20 so as to cause the angular position of the turntable 38 to correspond to the angular position of the preform 12A. The preform 12A is then transported along the heating path 36 by an associated turntable 38. The body 14 of the preform 12A is heated while the preform 12A travels along the active sections "H1, H2" of the heating path 36.

When the preform 12A reaches the transfer point 66 along the production itinerary 13 it is then taken up by an associated clamp 72 of the transfer wheel 70 which then transfers the preform 12A to the clamp 89 of a transport device. The preform 12A is then installed in the mold 88 of an associated forming substation 30 by the clamp 89. The clamps 89 are designed to prevent the preform 12A turning about its principal axis "Z1" in order to maintain the preform 12A as close as possible to its reference angular position.

However, it frequently happens that the preform 12A slips during its transfer from one transport device to the other downstream of the heating station 20. Moreover, the preform 12A is free to turn about its principal axis "Z1" in the mold 88 until the drive member 114 comes to immobilize it. To enable this slippage to be corrected the angular offset "α" of the preform 12A relative to its reference angular position is measured in the second measurement zone 107B with the aid of the angular marker 106 when the preform 12A comes to be installed in the mold 88.

The angular position of the preform 12A is corrected downstream of the second measurement zone 107B in the second correction zone 112B as a function of the angular offset "α" measured for said preform 12A in the second measurement zone 107B by means of the rotary nozzle 98.

This kind of production installation 10 enables containers 12B of good quality to be obtained and guarantees that the heating profile of the preform 12A corresponds to the shape of the molding cavity 90. However, each operation of correction of the position of the preform 12A has a duration proportional to the value of the angular offset "α" to be corrected in the second correction zone 112B. A result of this is that the production rate is limited by the correction operations.

Moreover, it happens that the heating profile is slightly offset relative to the position of the angular marker 106. This may be because of slippage of the preforms 12A between the first measurement zone 107A and being taken up a turntable 38. Although errors of this kind are generally very small, it remains possible further to improve the quality of the container 12B produced by minimizing the offset angle "α". In fact, a tolerance as to the angular offset is permissible, that is to say if the angular offset is in a particular range, for example between −5° and +5° inclusive, the influence of the angular offset on the quality of the finished container obtained is considered negligible. Accordingly, by reducing the angular offsets obtained for the majority of the preforms 12A in said tolerance range it is theoretically possible to avoid most of the preform orientation correction operations. The inventors have found that, to some degree, it is possible, on average, to reduce the value of the angular offsets "α" found in measurement zones 107 downstream of the first measurement zone 107A. Considering that the angular offsets "α" of the various preforms of a string of preforms are distributed in accordance with a curve such as a Gaussian curve, the angular offsets "α" are arranged on either side of the mean "αM", as illustrated in FIGS. 16 and 17. The tolerance zone is cross-hatched in FIGS. 16 and 17.

If the absolute value of said mean "αM" is above a particular threshold, that means that the majority of the preforms have an angular offset that is not in the tolerance range, as illustrated in FIG. 16.

The angular offset "α" applied during the subsequent correction operation would be reduced overall by choosing to compensate the angular orientation of the upstream preforms in such a manner as to create a mean "αM" equal to 0°, as represented in FIG. 17.

The consequence of this would therefore be to reduce the overall duration of the correction operations. If the majority of the preforms have an angular offset in the tolerance range it is even possible to eliminate totally the correction operation for those preforms.

The invention proposes to enhance the quality of the containers 12B and to increase the production rate thanks to a method for regulation of the angular position of the preforms 12A in the production installation 10. As illustrated in FIG. 18 the method carried out in accordance with the invention includes:

the first step "E1" of measuring an angular offset "α" of at least one particular preform 12A relative to a reference angular position in a measurement zone 107 of the production itinerary 13; and a second step "E2" of compensation of the angular position of the subsequent preforms 12A during a compensation operation in a compensation zone 122 upstream of said measurement zone 107 during which the angular orientation of the subsequent preforms 12A is modified by an updated compensation angle "α1" that is a function of the angular offset "α" measured for the at least one particular preform 12A during the first measurement step "E1" and a current compensation angle "α0" in such a manner as to reduce the angular offset "α" of the preforms 12A in said measurement zone 107.

The first measurement step "E1" proceeds in three phases "E1-1, E1-2, and E1-3", as explained above.

During the first iteration of the method the current compensation angle "α0" is initialized to 0°.

During subsequent iterations the current compensation angle "α0" is set equal to the updated compensation angle "α1" calculated during the immediately preceding iteration of the method.

Instead of merely correcting the angular position of the hollow bodies 12 in a correction zone 112 downstream of each measurement zone 107 the regulation method thus makes it possible to anticipate the angular offsets "α" to which the subsequent hollow bodies 12 in the single file will be subjected in the compensation zone 122 in order to reduce the correction to be effected in the correction zone 112.

The angular offsets "α" of the hollow bodies 12 in a string of hollow bodies have a random distribution. It is therefore not possible to eliminate completely the angular offset "α" found in each measurement zone. On the other hand, the invention seeks to reduce the mean "αM" of the angular offsets found in some measurement zones 107. The mean "αM" of the angular offsets is defined in the conventional manner as being the sum of the angular offsets "α" measured for the string of preforms 12A divided by the number of hollow bodies 12 in the string.

During the second compensation step "E2" the mean "αM" of the angular offsets measured for each hollow body 12 in the string of hollow bodies 12 is calculated by dividing the sum of the angular offsets by the number of hollow bodies 12 during a first phase "E2-1". The mean "αM" is calculated by the electronic control unit 110.

To obtain a mean "αM" representative of the distribution of the hollow bodies 12 it is of course possible to spread the isolated angular offset values "α" that depart too much from the mean "αM" established during the preceding iteration of the method in order not to take into account these angular offset "α" values deemed accidental. In fact these isolated angular offset values "α" risk falsifying the mean "αM" calculated by the electronic control unit. Then, during a second phase "E2-2", the updated compensation angle "α1" is calculated as a function of the calculated mean "αM" and as a function of the current compensation angle "α0". To this end, on each iteration the mean "αM" calculated from the measurements effected during the measurement step "E1" is subtracted from the current compensation angle "α0".

The value of the current compensation angle "α0" is therefore modified during the second step "E2" if the absolute value of the mean "αM" of the angular offsets for each hollow body 12 of a string of at least two consecutive particular hollow bodies 12 measured during the first measurement step "E1" is above a particular threshold, for example greater than 0°.

Then, during a third phase "E2-3", the orientation of the subsequent hollow bodies 12 is modified by the updated compensation angle "α1".

The method is reiterated cyclically to adjust the current compensation angle "α0" on each iteration. In a fourth phase "E2-4", the compensation angle "α1" updated in the preceding iteration is stored and used again as the current compensation angle "α0" during the next iteration. The current compensation angle "α0" is therefore modified regularly to approach the new mean "αM" of 0°.

The mean "αM" is for example calculated for a new string of hollow bodies when the last hollow body 12 of the preceding string has left the measurement zone 107.

Alternatively, the mean "αM" is calculated on a sliding basis, i.e. a new iteration of the method is undertaken when the preceding iteration has not finished. This enables the electronic control unit to calculate a sliding mean "αM" of the angular offset. A hollow body 12 can therefore belong to at least two distinct strings of hollow bodies 12.

There are described hereinafter embodiments of the invention that may be implemented individually or in a combined manner in the same production installation 10.

In accordance with a first embodiment of the invention, a first compensation zone 122A is arranged on the heating path 36 where the preforms 12A are supported by a turntable 38. The first compensation zone 122A is more particularly in the upstream passage section "P1". This makes it possible to compensate the position of the preforms 12A before heating thereof begins. The first compensation zone 122A is here formed by the first correction zone 112A. The angular position of the preforms 12A is compensated by rotation of each turntable 38 in the first compensation zone 122A by means of the orientation devices 84.

In accordance with this first embodiment the measurement step "E1" is carried out in a third measurement zone 107C that is arranged on the heating path 36 downstream of the first compensation zone 122A. Given that the orientation of the turntable 38 and therefore of the preform 12A is controlled all along the heating path 36, the third measurement zone 107C can be arranged anywhere on the heating path 36 downstream of the first compensation zone 122A.

In the example represented in the figures the third measurement zone 107C is in the downstream passage section "P3". Alternatively, the third measurement zone 107C is in the intermediate passive section "P2". Arranging the third measurement zone 107C in a passive section "P2, P3" of the heating path 36 makes it possible in particular to avoid exposing the imaging devices 108 to the heat produced by the heating members 22.

The compensation step "E2" is for example carried out concomitantly with the operation of correcting the angular position of the preform 12A. In this case, for each preform the electronic unit 110 calculates the sum "S" of the correction angle for said preform 12A measured in the first measurement zone 107A and the updated compensation angle "α1" calculated from the measurements carried out on the preceding string of preforms 12A in the third measurement zone 107C. Thus the preform 12A is turned in a single operation by said sum "S" at the level of the first compensation zone 122A that also forms the first correction zone 112A.

The compensation method in accordance with this first embodiment of the invention therefore makes it possible to achieve the best match between the heating profile of each preform 12A and the angular position of the angular marker 106.

In accordance with a second embodiment of the invention there is a second compensation zone 122B on the heating path 36 where the preforms 12A are supported by a turntable 38. The second compensation zone 122B is more particularly arranged on the downstream passive section "P3" just before the preform 12A is transferred to the first transfer wheel 70 and after the heating of the preform 12A has finished. This enables compensation of the position of the preforms 12A after heating thereof has finished.

The angular position of the preforms 12A is compensated by rotation of each turntable 38 in the second compensation zone 122B by means of one of the orientation devices 84.

In accordance with this second embodiment the measurement step "E1" is carried out in a second measurement zone 107B in the forming station 26 when the preform 12A is installed in the mold 88 before the forming operation.

The measurements effected in the second measurement zone 107B therefore enable individual correction of the angular position of each downstream preform 12A, but also compensation of the position of the following preforms 12A upstream.

The compensation step "E2" is therefore applied to the preforms that arrive at the end of the heating path 36 before being transferred to the forming station 26. This enables the best match to be achieved between the heating profile of the preforms 12A and the shape of the cavity 90, taking into account the small offsets that are likely to occur during the various transfers of preforms 12A from one transport device to the next and during their installation in the mold 88.

In accordance with a third embodiment of the invention, there is a third compensation zone 122C in the forming station 26, upstream of the forming operation.

The third compensation zone 122C is more particularly downstream of the second measurement zone 107B and upstream of the forming operation. This enables compensation of the position of the preforms 12A before forming thereof has begun.

The third compensation zone 122C is here arranged on the second angular sector "S2" of the forming path. Here the third compensation zone 122C is formed by the second correction zone 112B. The angular position of the preforms 12A is compensated by rotation of the drive member 114 when the preforms 12A are in the third compensation zone 122C.

In accordance with this third embodiment, the measurement step "E1" is carried out in a fourth measurement zone 107D in the forming station 26 downstream of the forming operation. Here the fourth measurement zone 107D is in the fourth angular sector "S4", where the preform 12A has been transformed into the container 12B, and upstream of the point 34 of extraction from the mold. This kind of arrangement of the fourth measurement zone 107D in particular enables verification that the angular position of the preforms 12A has been corrected properly in the second correction zone 107B.

The compensation step "E2" is for example carried out concomitantly with the operation of correcting the angular position of the preform 12A. In this case the electronic control unit 110 calculates for each preform the sum "S" of the correction angle measured for said preform 12A in the second measurement zone 107B and the updated compensation angle "α1" calculated from the measurements effected on the preceding string of preforms 12A in the fourth measurement zone 107D. Thus the preform 12A is turned in a single operation by said sum "S" at the level of the third compensation zone 122C that also forms the second correction zone 112B.

The compensation method in accordance with this third embodiment of the invention therefore enables the best possible match to be achieved between the heating profile of each preform 12A and the shape of the molding cavity 90.

The method carried out in accordance with the teachings of the invention advantageously enables reduction of the duration of or even elimination of the correction operations for each of the preforms in the correction zones 112.

The invention claimed is:

1. A method of regulation of the angular position of hollow bodies (12) in an installation (10) for production of containers (12B) by forming thermoplastic material preforms (12A) in which the hollow bodies (12) are moved in single file along a production itinerary (13) by individual support members (38, 88), each of which is equipped with means for causing the hollow body (12) to turn about its axis (Z1), the method comprising:
    measuring, in a first step (E1), an angular offset ($\alpha$) of at least one particular hollow body (12) relative to a reference angular position in a particular measurement zone (107B, 107C, 107D) of the production itinerary (13),
    compensating, in a second step (E2), the angular position of the subsequent hollow bodies (12) in a compensation zone (112A, 112B, 112C) upstream of said measurement zone (107B, 107C, 107D) during which the angular orientation of the subsequent hollow bodies (12) is modified by an updated compensation angle ($\alpha 1$) that is a function of the angular offset (a) measured for the at least one particular hollow body (12) in the first step (E1) and that is a function of a current compensation angle ($\alpha 0$) in such a manner as to reduce the angular offset (a) of the hollow bodies (12) in said measurement zone (107B, 107C, 107D).

2. The method as claimed in claim 1, wherein the value of the current compensation angle ($\alpha 0$) is modified in the second step (E2) if the mean ($\alpha M$) of the angular offsets of each hollow body (12) of a string of at least two consecutive particular hollow bodies (12) measured in the first detection step (E1) has an absolute value above a particular threshold.

3. The method as claimed in claim 1, wherein in the second step (E2) the updated compensation angle ($\alpha 1$) is calculated by subtracting the mean ($\alpha M$) of the angular offsets of the string of particular preforms (12) from the current compensation angle ($\alpha 0$).

4. The method as claimed in claim 1, wherein the method is reiterated cyclically, the current compensation angle ($\alpha 0$) being formed by the updated compensation angle ($\alpha 1$) of the preceding iteration.

5. The method as claimed in claim 4, wherein, during the first iteration, the current compensation angle ($\alpha 0$) is initialized to 0°.

6. The method as claimed in claim 1, wherein the installation (10) includes a heating station (20) that is equipped with a transport device (24) provided with support means, termed turntables (38), each of which enables individual transportation of a preform (12A) along a heating path forming a section of the production itinerary (13) and each of which enables the preform (12A) to be caused to turn about its axis (Z1), the compensation zone (112A, 112B) being arranged on the heating path while the preforms (12A) are supported by a turntable (38), the compensation of the angular position of the preforms (12A) being achieved by rotation of each turntable (38) by the updated compensation angle ($\alpha 1$) in the compensation zone (112A, 112B).

7. The method as claimed in claim 6, wherein the transport device (24) includes a chain (37) of turntables (38) movement of which is guided by two guide wheels (60, 62), the compensation zone (112A, 112B) being situated in a run of the chain (37) that meshes with one of the guide wheels (60).

8. The method as claimed in claim 7, wherein the compensation zone (112A) is situated in a run of the chain (37) that meshes with a guide wheel (60) downstream of a take-up point (64) at which the preforms (12A) are transferred from an upstream transport device (68) and before the beginning of the heating of the preform (12A).

9. The method as claimed in claim 8, wherein the measurement zone (107C) is situated in the heating station (20) in a run of the chain (37) that meshes with a guide wheel (60) upstream of a transfer point (66) at which the preforms (12A) are transferred to a downstream transport device (70) in the direction of a forming station (26) and after the heating of the preform (12) has been finished.

10. The method as claimed in claim 1, wherein the production installation (10) includes a forming station (26) in which each hollow body (12) is moved along a forming path forming a section of the production itinerary (13), each preform (12A) undergoing an operation of forming it into a final container (12B) along the forming path.

11. The method as claimed in claim 7, wherein the compensation zone (112B) is situated in a run of the chain (37) that meshes with a guide wheel (60) upstream of a transfer point (66) at which the preforms (12A) are transferred to a downstream transport device (70) in the direction of a forming station (26) and after the heating of the preform (12A) has been finished.

12. The method as claimed in claim 11, wherein:
the production installation (10) includes a forming station (26) in which each hollow body (12) is moved along a forming path forming a section of the production itinerary (13), each preform (12A) undergoing an operation of forming it into a final container (12B) along the forming path, and
the measurement zone (107B) is situated in the forming station (26) downstream of the heating station (20) before the forming operation is begun.

13. The method as claimed in claim 10, wherein the compensation zone (112C) is situated along the forming path before the forming operation is begun.

14. The method as claimed in claim 13, wherein the measurement zone (107B) is situated in the forming station (26) along the forming path after the forming operation has been finished.

15. The method as claimed in claim 2, wherein in the second step (E2) the updated compensation angle ($\alpha 1$) is calculated by subtracting the mean ($\alpha M$) of the angular offsets of the string of particular preforms (12) from the current compensation angle ($\alpha 0$).

16. The method as claimed in claim 2, wherein the method is reiterated cyclically, the current compensation angle ($\alpha 0$) being formed by the updated compensation angle ($\alpha 1$) of the preceding iteration.

17. The method as claimed in claim 3, wherein the method is reiterated cyclically, the current compensation angle ($\alpha 0$) being formed by the updated compensation angle ($\alpha 1$) of the preceding iteration.

18. The method as claimed in claim 2, wherein the installation (10) includes a heating station (20) that is equipped with a transport device (24) provided with support means, termed turntables (38), each of which enables individual transportation of a preform (12A) along a heating path forming a section of the production itinerary (13) and each of which enables the preform (12A) to be caused to turn about its axis (Z1), the compensation zone (112A, 112B) being arranged on the heating path while the preforms (12A) are supported by a turntable (38), the compensation of the angular position of the preforms (12A) being achieved by rotation of each turntable (38) by the updated compensation angle ($\alpha 1$) in the compensation zone (112A, 112B).

19. The method as claimed in claim 3, wherein the installation (10) includes a heating station (20) that is equipped with a transport device (24) provided with support means, termed turntables (38), each of which enables individual transportation of a preform (12A) along a heating path forming a section of the production itinerary (13) and each of which enables the preform (12A) to be caused to turn about its axis (Z1), the compensation zone (112A, 112B) being arranged on the heating path while the preforms (12A) are supported by a turntable (38), the compensation of the angular position of the preforms (12A) being achieved by rotation of each turntable (38) by the updated compensation angle ($\alpha 1$) in the compensation zone (112A, 112B).

20. The method as claimed in claim 2, wherein the production installation (10) includes a forming station (26) in which each hollow body (12) is moved along a forming path forming a section of the production itinerary (13), each preform (12A) undergoing an operation of forming it into a final container (12B) along the forming path.

* * * * *